United States Patent
Flowers et al.

[11] Patent Number: 6,084,196
[45] Date of Patent: Jul. 4, 2000

[54] ELEVATED-TEMPERATURE, PLASMA-TRANSFERRED ARC WELDING OF NICKEL-BASE SUPERALLOY ARTICLES

[75] Inventors: Gilbert E. Flowers, Cincinnati; Earl L. Kelly, Jr., West Chester; Warren D. Grossklaus, Jr., West Chester; James D. Barber, West Chester, all of Ohio; Gray W. Grubbs, Williamstown, Ky.; Levi Williams, Milford, Ohio

[73] Assignee: General Electric Company, Cincinnati, Ohio

[21] Appl. No.: 09/030,022

[22] Filed: Feb. 25, 1998

[51] Int. Cl.$^7$ .................................................. B23K 9/00
[52] U.S. Cl. .................................. 219/121.46; 219/121.48
[58] Field of Search ..................... 219/121.46, 121.48, 219/121.54, 130.4, 121.63; 228/119, 232; 148/126, 404

[56] References Cited

U.S. PATENT DOCUMENTS

| | | | |
|---|---|---|---|
| 3,802,938 | 4/1974 | Collins et al. | 148/126 |
| 4,098,450 | 7/1978 | Keller et al. | 228/119 |
| 4,125,754 | 11/1978 | Wasserman et al. | 219/121 |
| 4,225,769 | 9/1980 | Wilkins | 219/130.4 |
| 4,285,459 | 8/1981 | Baladjanian et al. | 228/119 |
| 4,590,354 | 5/1986 | Marhic et al. | 219/121 PM |
| 4,621,183 | 11/1986 | Takeuchi et al. | 219/121 |
| 4,663,515 | 5/1987 | Kneeland et al. | 219/121 PT |
| 4,672,171 | 6/1987 | Cusimano et al. | 219/121 |
| 4,689,463 | 8/1987 | Shubert | 219/76.16 |
| 4,739,146 | 4/1988 | Lindland et al. | 219/121 |
| 4,745,256 | 5/1988 | Shubert | 219/121 |
| 4,808,055 | 2/1989 | Wertz et al. | 416/224 |
| 4,822,248 | 4/1989 | Wertz et al. | 416/192 |
| 4,878,953 | 11/1989 | Saltzman et al. | 148/4 |
| 4,940,390 | 7/1990 | Clark et al. | 416/241 |
| 5,080,734 | 1/1992 | Krueger et al. | 148/410 |
| 5,725,692 | 3/1998 | DeLuca et al. | 148/410 |

OTHER PUBLICATIONS

"A Powder Fed Plasma Transferred Arc Process for Hard Facing Internal Combustion Engine Valve Seats" by J Milligan & S Narasimhan, Paper Series 800317, Society of Automotive Engineers, Inc., pp. 1–12.

*Primary Examiner*—Tu Ba Hoang
*Assistant Examiner*—Quang Van
*Attorney, Agent, or Firm*—Andrews C. Hess; Gerry S. Gressel

[57] ABSTRACT

A nickel-base superalloy article which is susceptible to strain-age cracking and has a directionally oriented, single crystal, or equiaxed grain structure is repaired with minimal welding heat input into the article. The article is first heated to a welding temperature of from about 1650° F. to about 2000° F. in an inert atmosphere. A damaged area of the article is weld repaired using a plasma-transferred arc welder which vaporizes a filler metal in a plasma arc and deposited the vaporized metal onto the article to form a weld overlay. Minimal additional heat is added to the article during welding, as the weldment metal is vaporized remotely from the article.

18 Claims, 4 Drawing Sheets

ELEVATED-TEMPERATURE, PLASMA-TRANSFERRED ARC WELDING OF NICKEL-BASE SUPERALLOY ARTICLES

BACKGROUND OF THE INVENTION

This invention relates to the welding of articles, and, more particularly, to the weld repair of articles made of nickel-base superalloys that are subject to strain-age cracking.

Nickel-base superalloys are extensively used in aircraft gas turbine (jet) engines. These superalloys typically develop their peak strengths through aging to produce a distribution of gamma prime precipitates in a gamma solid solution matrix. Those superalloys which have the highest volume fractions of the precipitates—typically 40 volume percent or more—exhibit the highest strengths and creep resistances at temperatures near their melting points, on the order of 2000° F. Unfortunately, however, these superalloys also have limited ductilities at elevated temperatures, and are consequently subject to cracking due to differential thermal strains in some temperature ranges, a phenomenon termed "strain-age" cracking.

These high-volume-fraction gamma prime superalloys are used in articles such as turbine blades and vanes, which operate at high temperatures for prolonged periods. The superalloys are typically directionally processed to produce blades and vanes with directionally oriented grains or in single-crystal form, which result in the best performance. Notwithstanding the high-temperature capabilities of the alloys, during service the articles are often damaged by hot gas erosion and other types of mechanisms. The tips of the turbine blades and vanes are the regions most prone to such damage. Consequently, these areas are routinely inspected for damage. When damage is found, the article is removed from service and, if the damage is not too severe, repaired.

Repair of the damaged region is accomplished by a welding process. After the damaged area is cleaned, a filler metal is melted and applied to the damaged area. The application is typically accomplished by tungsten inert gas welding, wherein an electric arc is struck between the article and a tungsten electrode, forming a molten pool in the damaged region. A rod of the filler metal is fed into the arc and the pool, melting and filling the damaged region. Upon cooling of the molten filler metal, the resulting weldment is finished as necessary to complete the repair.

While effective to fill the damaged area, the weld repair procedure also creates differential thermal stresses that lead to strain-age cracking in the weldment and in adjacent regions of the welded substrate. This cracking is injurious to the performance of the article, and a number of methods have been proposed to overcome the cracking. In one such approach, the article is pre-heated prior to welding to a temperature greater than its aging temperature, and then maintained at that temperature during the welding operation. The incidence of cracking is somewhat reduced as compared with weld repairing at ambient temperature, but strain-age cracking still remains and is deleterious to the subsequent performance of the repaired article.

The inventors have recognized a need for yet further improvements in the approach used in repairing articles made of superalloys that are susceptible to strain-age cracking. The present invention provides such an improved approach.

SUMMARY OF THE INVENTION

The present invention provides an improved method for welding superalloys susceptible to strain-age cracking. The procedure is particularly useful in repairing damaged regions of articles made of the alloys. The approach of the invention minimizes localized heat input to the article during the welding operation, in turn reducing the thermal gradients that ultimately lead to strain-age cracking. Consequently, strain-age cracking is reduced in and around the weldment.

In accordance with the invention, a method is provided for welding a nickel-base superalloy article that is susceptible to strain-age cracking. Typically, the superalloy has a composition which is capable of forming at least about 40 volume percent gamma prime phase dispersed in a gamma phase matrix upon aging, which produces good elevated temperature strength. The approach is preferably applied with those articles having directionally oriented grains or single-crystal structures. The method includes heating the article to a welding temperature of from about 1650° F. to about 2000° F., more preferably from about 1700° F. to about 1800° F., and applying a weld overlay of the filler metal to a portion of the article using a plasma-transferred arc (PTA) welder, concurrently with the step of heating. The plasma-transferred arc welder includes a welding torch having an electrode operable to strike a plasma arc to a workpiece, a source of an inert gas shield around the plasma arc, and a source of a filler metal, preferably a powder, disposed to add the filler metal into the plasma arc.

The weld repair is preferably accomplished in a closed chamber such as a glove box, which is filled with a protective atmosphere such as an inert gas. The article to be repaired is placed into the chamber and pre-heated to the desired welding temperature. Pre-heating is preferably accomplished relatively rapidly, as with focused high-intensity lamps such as quartz lamps. After the article reaches the pre-heating temperature, the filler metal is applied by the plasma-transferred arc technique to produce a weld overlay. The weld repair may be accomplished either manually or with a programmed welding machine.

The PTA welding technique yields results superior to those of the tungsten inert gas (TIG) technique, in large part because the heat input into the weld zone is less in PTA welding. The result is a reduced thermal gradient in and adjacent to the weldment, and reduced strain-age cracking in the article.

The present invention also provides a PTA welding torch with a low heat energy input to the article being welded. This PTA welding torch is suitable for manual or automated welding, and can be moved in any direction. A shielded plasma is formed in the torch, and powder is fed coaxially into the periphery of the plasma within the body of the torch.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
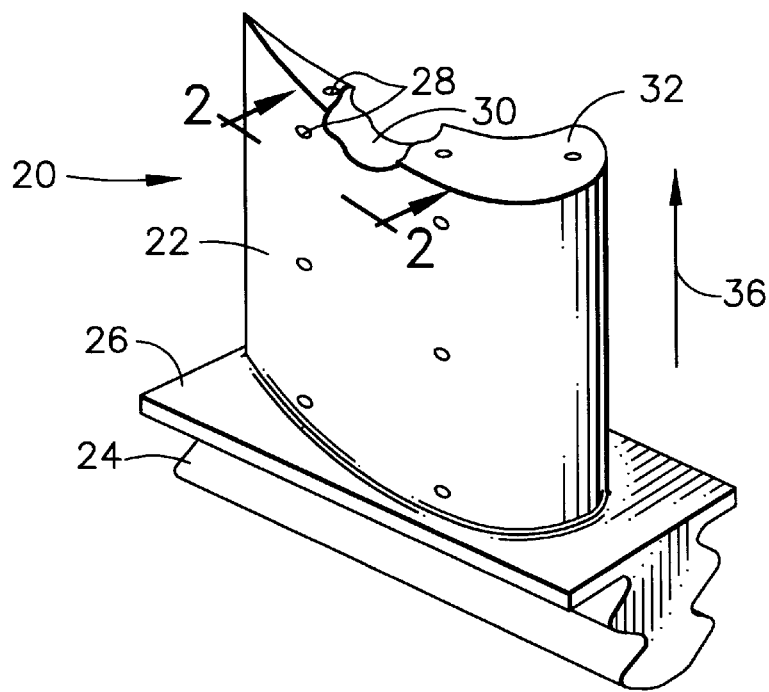
FIG. 1 is a perspective view of a turbine blade requiring repair.

FIG. 1 depicts an article that is a component of a gas turbine engine such as a turbine blade or turbine vane, and in this case a high-pressure turbine blade article 20, made of a nickel-base superalloy. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. Cooling channels optionally extend through the interior of the turbine blade 20, and their surface openings 28 may be seen in FIG. 1.

Figure 2:
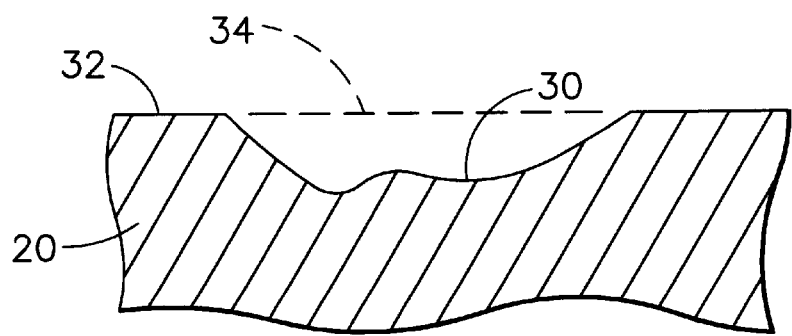
FIG. 2 is an enlarged schematic sectional view of the turbine blade of FIG. 1, taken generally along line 2—2.

As shown in FIGS. 1 and 2, the turbine blade 20 has been damaged in a region 30 near its tip 32, where some of the base metal has been removed during service. Other common regions of damage are the leading and training edges of the blade article, where the article is also relatively thin. Such removal of metal and damage is a normal occurrence in the extremely demanding environment of operation of the turbine blade 20. The present invention is concerned with repairing the damaged region 30, by applying a weld overlay 34, indicated with a dashed line in FIG. 2, into the damaged region. The weld repair restores the tip 32 to its original configuration and allows the article 20 to be returned to service.

Figure 3:
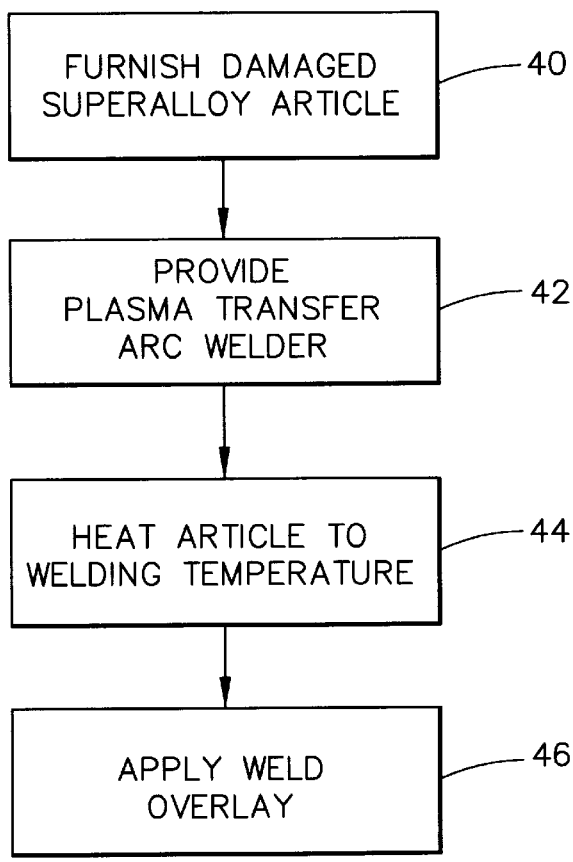
FIG. 3 is a block flow diagram of a preferred approach for practicing the invention.

FIG. 3 illustrates a preferred approach to the weld repair of the article 20. The damaged article 20 is provided, numeral 40. The article is preferably a turbine blade as illustrated, a turbine vane, another component of a gas turbine engine, or other component made of a nickel-base superalloy susceptible to strain-age cracking. The nickel-base superalloy preferably has a directionally oriented grain structure, with the grains oriented parallel to a longitudinal direction 36 of the article 20, or is of a directionally oriented, substantially single-crystal structure. Such oriented structures are particularly susceptible to strain-age cracking due to rapid dendritic cracking that occurs much faster than with equiaxed grain structures.

Figure 4:
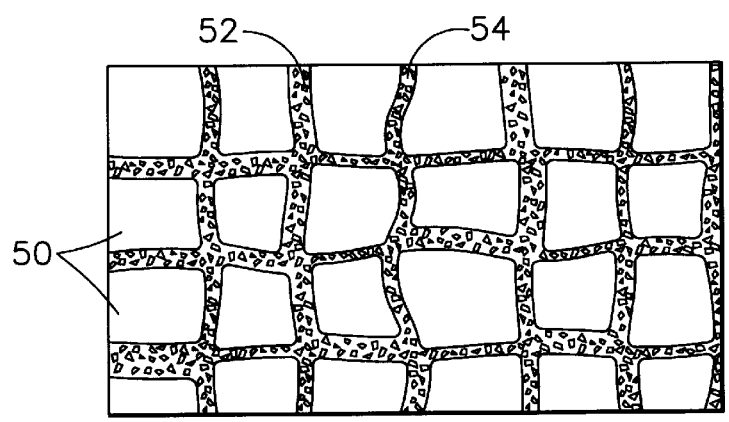
FIG. 4 is a schematic illustration of the microstructure of a nickel-base superalloy.

The metallurgical microstructure of a typical nickel-base superalloy that is susceptible to strain-age cracking is illustrated in FIG. 4. That is, FIG. 4 illustrates the microstructure of the article 20, magnified several hundred times. The article is capable of forming the type of microstructure illustrated, although the microstructure at the time of welding may be different. The superalloy is nickel-base, meaning that it has about 50 or more weight percent nickel, with alloying elements added. The microstructure comprises large particles 50 of gamma prime ($\gamma'$) phase and small particles 52 of gamma prime phase, embedded in a matrix 54 of gamma ($\gamma$) phase. The gamma prime phase is based upon the intermetallic composition $Ni_3Al$, but there may be other elements incorporated into the composition, such as, for example, titanium or tantalum to produce the intermetallic composition $Ni_3(Al,Ti,Ta)$. The large particles 50 and the small particles 52 are both gamma prime phase, of approximately the same composition, but they are formed at different stages of the heat treatment or aging process. The matrix 54 is a solid solution of nickel with alloying elements such as cobalt, chromium, tungsten, and molybdenum dissolved therein.

The gamma prime phase in the form of the large particles 50 and the small particles 52 in total comprises at least about 40 percent by volume of the total of the entire structure (i.e., large particles 50, small particles 52, and matrix 54). More preferably, the gamma prime phase comprises at least about 55–60 volume percent of the structure. Most preferably, the gamma prime phase comprises about 55–60 volume percent of the structure. Such alloys achieve the high elevated temperature strengths required in articles such as turbine blades and vanes, but they may also have low ductilities that lead to susceptibility to strain-age cracking. The susceptibility to strain-age cracking is evidenced by small cracks and/or fissuring in the fusion weld deposit and adjacent regions during the welding operation and shortly thereafter. This susceptibility makes their welding and weld repairing by conventional procedures quite difficult.

Examples of nickel-base superalloys that are susceptible to strain-age cracking, and are therefore within the scope of the invention, include Rene 77, having a nominal composition, in weight percent, of 15.0 percent cobalt, 14.2 percent chromium, 4.3 percent aluminum, 3.4 percent titanium, 4.2 percent molybdenum, 0.5 percent iron, 0.2 percent silicon, 0.15 percent manganese, 0.07 percent carbon, 0.04 percent zirconium, 0.016 percent boron, balance nickel; Rene 80, having a nominal composition, in weight percent, of 9.5 percent cobalt, 14.0 percent chromium, 4.0 percent tungsten, 3.0 percent aluminum, 5.0 percent titanium, 4.0 percent molybdenum, 0.2 percent iron, 0.2 percent silicon, 0.2 percent manganese, 0.17 percent carbon, 0.03 percent zirconium, 0.015 percent boron, balance nickel; Rene 100, having a nominal composition, in weight percent, of 15.0 percent cobalt, 9.5 percent chromium, 5.5 percent aluminum, 4.2 percent titanium, 3.0 percent molybdenum, 1.0 percent iron, 1.0 percent vanadium, 0.5 percent silicon, 0.5 percent manganese, 0.18 percent carbon, 0.06 percent zirconium, 0.015 percent boron, balance nickel; and In-738, having a nominal composition, in weight percent, of 8.5 percent cobalt, 16.0 percent chromium, 3.4 percent aluminum, 3.4 percent titanium, 2.6 percent tungsten, 1.7 percent tantalum, 1.7 percent molybdenum, 0.11 percent carbon, 0.05 percent zirconium, 0.010 percent boron, balance nickel.

A plasma-transferred arc (PTA) welder is provided, numeral 42. PTA welding and welding apparatus are known in the art, and are described, for example, in U.S. Pat. Nos. 4,125,754; 4,672,171; and 4,745,256. The welding apparatus includes a welding torch and its support equipment in the form of power supplies, gas supplies, feedstock, and the like.

Figure 5:
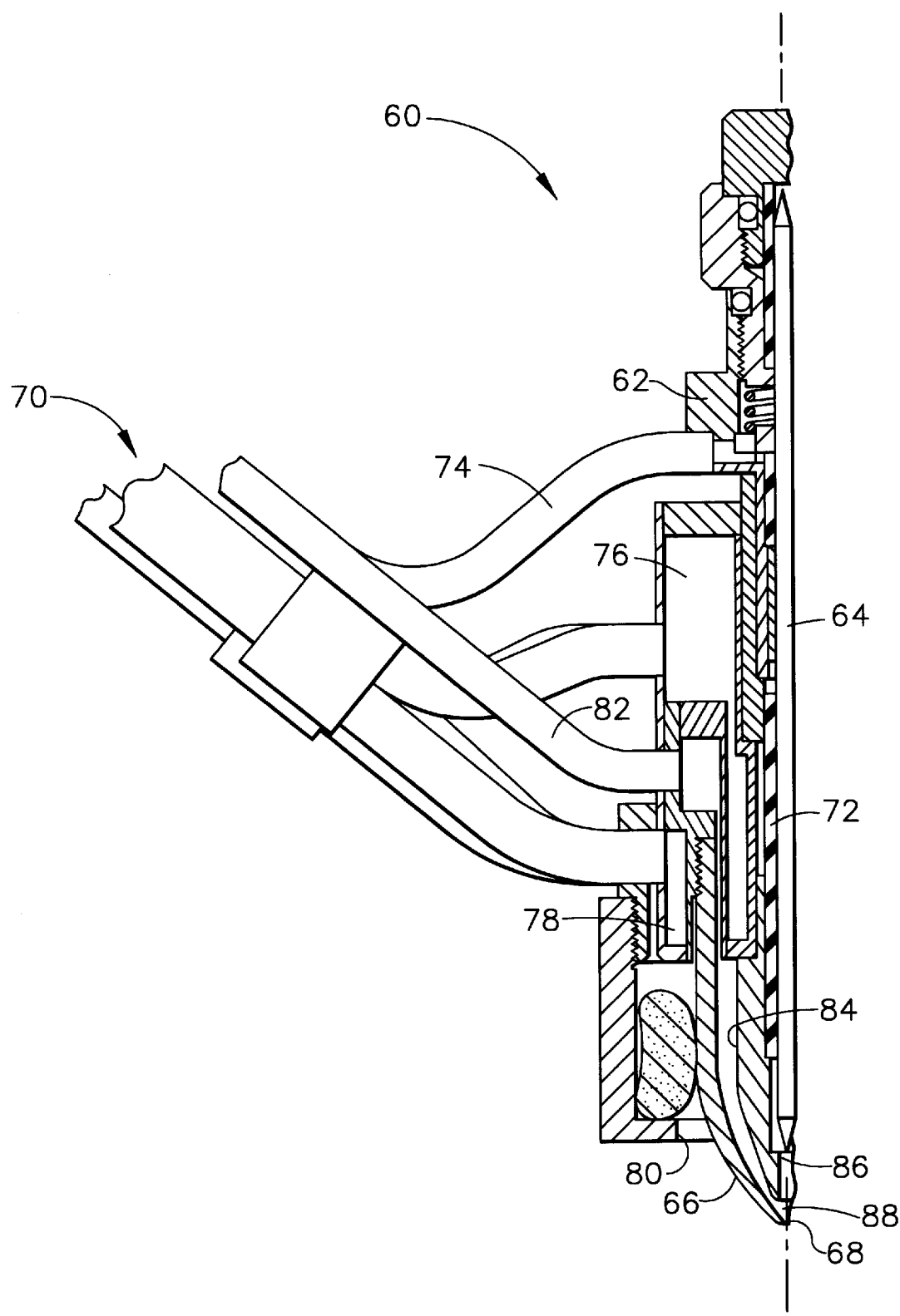
FIG. 5 is a sectional view of a preferred plasma-transferred arc welding torch.

FIG. 5 illustrates a preferred PTA welding torch 60 for use in the present invention. This welding torch 60 utilizes known support equipment such as described in the above-referenced patents. The welding torch 60 is generally cylindrically symmetric, except for external hookups, and includes a body 62, a tungsten electrode 64 mounted along the centerline of the body 62, a powder nozzle 66 mounted at one end of the body 62 and having an aperture 68 through which the plasma and feedstock pass, and external gas, feedstock, and electrical lines, collectively indicated as numeral 70.

The tungsten electrode 64 is mounted to the body 62 by electrical insulators 72. Electrical power is supplied to the tungsten electrode 64 by power feeds, which are not visible in the drawing. A flow of a plasma orifice gas 74, preferably argon, is introduced to the space around the tungsten electrode 64 and flows along its length (and through openings in the insulators 72) and around its tip, to eventually exit the torch 60 through the aperture 68.

The body of the torch 60 is water cooled by water flowing in passages 76 and 78 and supplied by respective external water supply lines. A flow of a shield gas, preferably an inert gas such as argon plus 2 percent by volume helium, enters the torch body, flows along a portion of its length, and exits through a shield gas nozzle 80. The shield gas nozzle 80 is generally concentric with the powder nozzle 66, but is larger in diameter than the powder nozzle 66 so that the powder nozzle 66 and the plasma and powder/vaporized powder flowing therefrom are shielded from oxidation.

A flow 82 of a powder of filler metal, fluidized in a gas stream, is provided to the torch 60. The flow 82 enters passageways 84 within the torch body 62, flows along a portion of the length of the body 62, and exits through the powder nozzle 66. The powder is the filler metal used to form the weld overlay 34. The powder is preferably a pre-alloyed powder, but powders of the constituents may also be used. The filler metal is preferably of about the same composition as the superalloy that forms the article 20. Alternatively, other compositions may be used. Also alternatively, the feed of the filler alloy may be in a wire form into the plasma, rather than as a powder feed. The powder feed is preferred, because the small powder particles melt and vaporize more efficiently than does the bulk wire and because the powder may be supplied from around the entire circumference of the powder nozzle 66.

When the torch 60 is operating, a plasma is produced in a plasma space 86 at the tip of the tungsten electrode 64. The plasma expands and exits the torch through the powder nozzle 66, aided by the flow of the plasma orifice gas. The flow of powder is introduced into the plasma in a mixing region 88. In the mixing region, and downstream therefrom as the mix of plasma and powder exits the torch 60 through the powder nozzle 66 and flows toward the area at which the weld overlay is to be deposited, the powder melts and then, preferably, vaporizes in the hot plasma. The melted/vaporized powder impacts the cooler substrate in the damaged area, and freezes in place to form the weld overlay.

The PTA torch 60 is preferred because it is circumferentially continuous and circularly symmetric as to the flow of powder. Some prior PTA torches inject the powder into the plasma in an asymmetric manner and/or from one or more discrete circumferential locations, so that the character of the weldment varies according to the angle of the torch, the direction of movement of the torch, and other factors. Examples of such PTA torches include the external-flow powder approach wherein the powder is supplied through a single powder nozzle, and the focused-flow powder approach wherein there are two or more discrete powder nozzles. These other PTA torches also produce a larger weld pool, thereby consuming more power, and tend to spill and waste relatively large amounts of expensive superalloy powder. The PTA torch 60 may be used in manual welding procedures wherein the torch is operated manually by a welder, or in an automated welding procedure wherein the torch is operated by a programmed welding machine. The present PTA torch also utilizes relatively low power to deposit the overlay. The power consumed by the torch is typically at from about 21 to about 34 volts and from about ½ to about 50 amperes. In a typical operating condition, the voltage is 28 volts, the current is ½–15 amperes, and the powder flow rate is about 2.8 grams per second.

The PTA torch for achieving the weld repair by overlay application is used instead of other techniques such as tungsten inert gas (TIG) welding. In PTA overlay deposition, the filler metal powder is heated and vaporized remotely from the workpiece, and there is relatively little heat transferred into the workpiece by the plasma. The surface of the workpiece is melted in only a very thin region to achieve good adherence of the overlay, but no large pool is formed as in TIG weld overlays.

Figure 6:
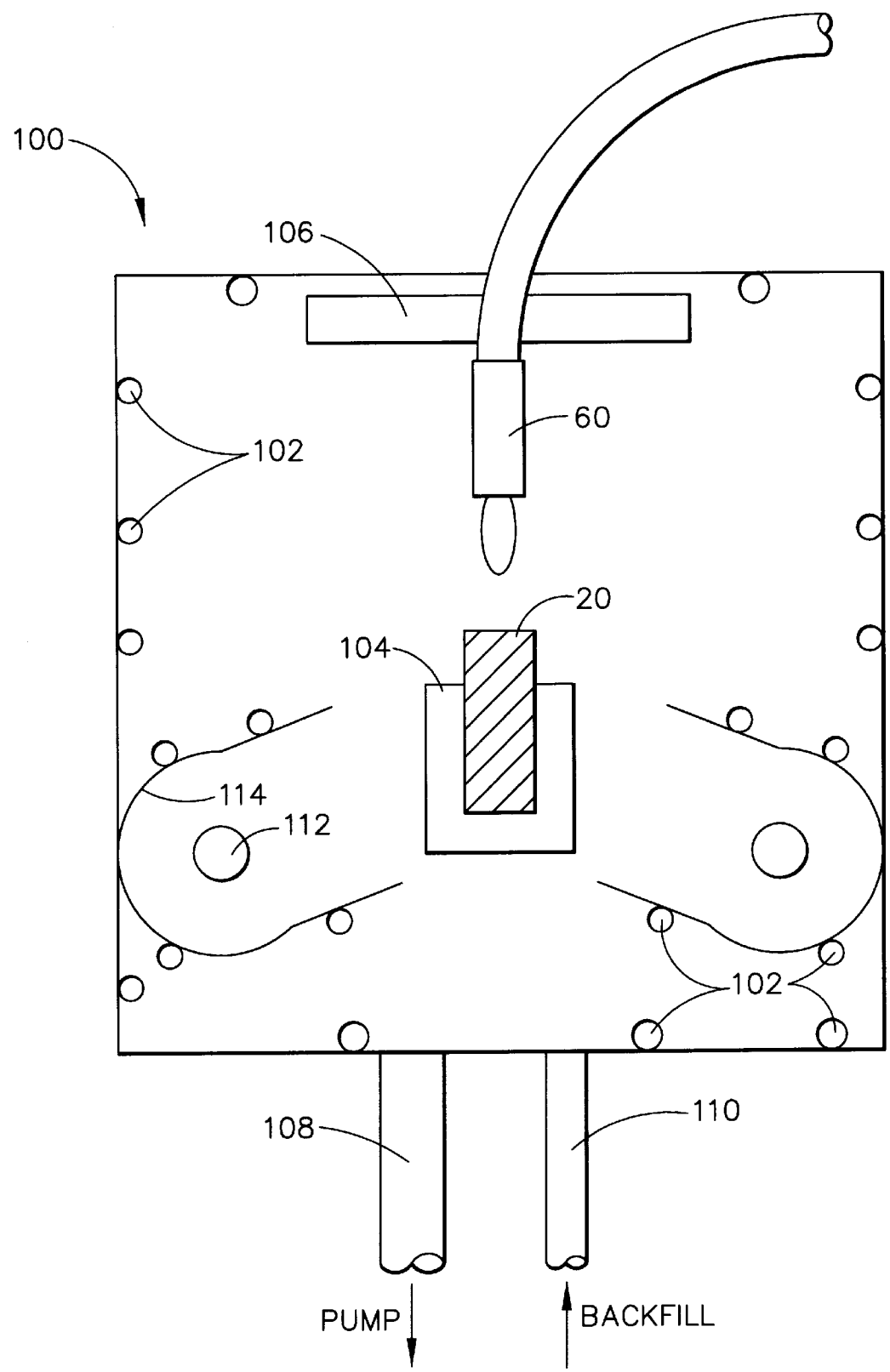
FIG. 6 is a schematic diagram of a chamber and system used in weld repair.

Returning to FIG. 3, the article 20 is heated to a welding temperature, numeral 44. The heating is preferably accomplished in a welding chamber 100, such as that illustrated in FIG. 6. The welding chamber 100 is a closed chamber, such as a glove box, that is supplied with water cooling lines 102 at its walls and at other critical locations. The article 20 is supported on a support 104, where the damaged area is accessible. The PTA torch 60 is inserted into the chamber 100 though an access port 106 configured to admit the PTA torch 60 but to maintain a controlled atmosphere within the chamber 100. The atmosphere within the chamber 100 is a non-oxidizing gas such as argon. To produce that atmosphere, the chamber 100 may be evacuated through a vacuum port 108 and backfilled with the inert gas through a backfill line 110, either sequentially or concurrently. Alternatively, the inert gas may be continuously flowed through the chamber 100 until it is fully purged.

When the PTA torch 60 is operated in the chamber 100 full of inert gas, the shield gas nozzle 80 may not be necessary, as the insert atmosphere in the chamber 100 provides the shielding function. In that case, the shield gas nozzle 80 may be removed and no shield gas used in the PTA torch itself. This configuration affords the operator a better view of the region near the tip of the PTA torch 60, an important consideration in manual weld repair of small regions such as the tip of the turbine blade, and in confined spaces such as the small space available within the heating volume.

While in the welding chamber 100, the article 20 is heated to the welding temperature. This heating minimizes thermal gradients in the article and increases the ductility of the article during the welding operation. The welding temperature to which the article is preheated and heated is preferably from about 1650° F. to about 2000° F., most preferably from about 1700° F. to about 1800° F. If the welding temperature is below about 1650° F., cracking is likely to occur during the welding operations. If the welding temperature is above about 2000° F., undesirable phase transformations may occur.

In the welding chamber 100, the article 20 is most conveniently heated to the welding temperature using high-intensity radiant heating lamps, such as quartz lamps 112. The energy of each lamp 112 is focused onto the article 20 by a parabolic reflector 114. Using such lamps, the article 20 may be rapidly heated to the welding temperature. A relatively rapid heating is preferred to prevent undesirable metallurgical reactions. Other heaters such as electric resistance heaters or induction heaters may also be used as appropriate to the particular article.

The weld overlay is applied to the article, numeral 46. The application of the weld overlay is preferably concurrent with the heating, in the sense that the heaters are extinguished only after all welding of the article is completed.

The article is preheated, and additional heat is added in the region of the weld overlay during the operation of the PTA torch. However, the magnitude of the added heat is relatively small, and is to be contrasted with the very high heat input required when the article is not preheated, and the high heat input required even if the article is preheated but the welding is accomplished by a TIG or other high-heat-input procedure. When there is a high heat input to a local region of a nickel-base superalloy susceptible to strain-age cracking, there is a greatly increased likelihood of the appearance of strain-age cracking. The present approach of a combination of preheating and heating, and the use of a low-heat-input welding technique such as the PTA torch, results in greatly reduced cracking due to the reduced temperature gradients within the article.

This invention has been described in connection with specific embodiments and examples. However, those skilled in the art will recognize various modifications and variations of which the present invention is capable without departing from its scope as represented by the appended claims.

What is claimed is:

1. A method for welding a nickel-base superalloy article, comprising the steps of furnishing a nickel-base superalloy article, the superalloy article having a composition operable to produce at least about 40 volume percent gamma prime phase dispersed in a gamma phase matrix upon aging;

providing a plasma-transferred arc welder, the plasma-transferred arc welder comprising a welding torch including an electrode operable to strike a plasma arc to the article, a source of an inert gas shield around the plasma arc, and a source of a filler metal disposed to add the filler metal into the plasma arc;

heating the article to a welding temperature of from about 1650° F. to about 2000° F.; and applying a weld overlay of the filler metal to a portion of the article using the plasma-transferred arc welder, concurrently with the step of heating and while the article is at the welding temperature.

2. The method of claim 1, wherein the step of furnishing a nickel-base superalloy article includes the step of furnishing an article selected from the group consisting of a turbine blade and a turbine vane.

3. The method of claim 1, wherein the step of furnishing a nickel-base superalloy article includes the step of furnishing a single-crystal article.

4. The method of claim 1, wherein the step of furnishing a nickel-base superalloy article includes the step of furnishing a directionally solidified article.

5. The method of claim 1, wherein the step of furnishing includes the step of furnishing an article made of an alloy having a nominal composition, in weight percent, selected from the group consisting of 15.0 percent cobalt, 14.2 percent chromium, 4.3 percent aluminum, 3.4 percent titanium, 4.2 percent molybdenum, 0.5 percent iron, 0.2 percent silicon, 0.15 percent manganese, 0.07 percent carbon, 0.04 percent zirconium, 0.016 percent boron, balance nickel; 9.5 percent cobalt, 14.0 percent chromium, 4.0 percent tungsten, 3.0 percent aluminum, 5.0 percent titanium, 4.0 percent molybdenum, 0.2 percent iron, 0.2 percent silicon, 0.2 percent manganese, 0.17 percent carbon, 0.03 percent zirconium, 0.015 percent boron, balance nickel; 15.0 percent cobalt, 9.5 percent chromium, 5.5 percent aluminum, 4.2 percent titanium, 3.0 percent molybdenum, 1.0 percent iron, 1.0 percent vanadium, 0.5 percent silicon, 0.5 percent manganese, 0.18 percent carbon, 0.06 percent zirconium, 0.015 percent boron, balance nickel; and 8.5 percent cobalt, 16.0 percent chromium, 3.4 percent aluminum, 3.4 percent titanium, 2.6 percent tungsten, 1.7 percent tantalum, 1.7 percent molybdenum, 0.11 percent carbon, 0.05 percent zirconium, 0.010 percent boron, balance nickel.

6. The method of claim 1, wherein the step of heating includes the step of heating the article to a temperature of from about 1700° F. to about 1800° F.

7. The method of claim 1, wherein the step of heating includes the step of placing the article into a closed container having an inert atmosphere, and heating the article to the welding temperature using focused lamp heaters.

8. The method of claim 1, wherein the step of applying includes the step of moving the welding torch relative to the article manually.

9. The method of claim 1, wherein the step of applying includes the step of moving the welding torch relative to the article using a programmed machine.

10. The method of claim 1, wherein the step of providing a plasma-transferred arc welder includes the step of providing a source of a metallic powder operable to inject a coaxial flow of the powder uniformly around a circumference of the plasma arc and into a periphery of the plasma arc at a location within the welding torch.

11. The method of claim 1, wherein the nickel-base superalloy article has a directionally oriented grain structure.

12. A method for welding a nickel-base superalloy article, comprising the steps of furnishing a nickel-base superalloy article having a directionally oriented grain structure, the superalloy article being susceptible to strain-age cracking upon welding at ambient temperature, the superalloy article capable of forming at least about 40 volume percent gamma prime phase dispersed in a gamma phase matrix upon aging;

providing a plasma-transferred arc welder, the plasma-transferred arc welder comprising a welding torch including an electrode operable to strike a plasma arc to the article, a source of an inert gas shield around the plasma arc, and a source of a metallic powder operable to inject a coaxial flow of the powder uniformly around a circumference of the plasma arc and into a periphery of the plasma arc at a location within the welding torch;

heating the article to a welding temperature of from about 1650° F. to about 2000° F.; and applying a weld overlay of the powder to a portion of the article using the plasma-transferred arc welder, concurrently with the step of heating and while the article is at the welding temperature.

13. The method of claim 12, wherein the step of furnishing a nickel-base superalloy article includes the step of furnishing an article selected from the group consisting of a turbine blade and a turbine vane.

14. The method of claim 12, wherein the step of furnishing a nickel-base superalloy article includes the step of furnishing a single-crystal article.

15. The method of claim 12, wherein the step of furnishing a nickel-base superalloy article includes the step of furnishing a directionally solidified article.

16. The method of claim 12, wherein the step of furnishing includes the step of furnishing an article made of an alloy having a nominal composition, in weight percent, selected from the group consisting of 15.0 percent cobalt, 14.2 percent chromium, 4.3 percent aluminum, 3.4 percent titanium, 4.2 percent molybdenum, 0.5 percent iron, 0.2 percent silicon, 0.15 percent manganese, 0.07 percent carbon, 0.04 percent zirconium, 0.016 percent boron, balance nickel; 9.5 percent cobalt, 14.0 percent chromium, 4.0 percent tungsten, 3.0 percent aluminum, 5.0 percent titanium, 4.0 percent molybdenum, 0.2 percent iron, 0.2 percent silicon, 0.2 percent manganese, 0.17 percent carbon, 0.03 percent zirconium, 0.015 percent boron, balance nickel; 15.0 percent cobalt, 9.5 percent chromium, 5.5 percent aluminum, 4.2 percent titanium, 3.0 percent molybdenum, 1.0 percent iron, 1.0 percent vanadium, 0.5 percent silicon, 0.5 percent manganese, 0.18 percent carbon, 0.06 percent zirconium, 0.015 percent boron, balance nickel; and 8.5 percent cobalt, 16.0 percent chromium, 3.4 percent aluminum, 3.4 percent titanium, 2.6 percent tungsten, 1.7 percent tantalum, 1.7 percent molybdenum, 0.11 percent carbon, 0.05 percent zirconium, 0.010 percent boron, balance nickel.

17. The method of claim 12, wherein the step of heating includes the step of heating the article to a temperature of from about 1700° F. to about 1800° F.

18. The method of claim 12, wherein the step of heating includes the step of placing the article into a closed container having an inert atmosphere, and heating the article to the welding temperature using focused lamp heaters.

\* \* \* \* \*